United States Patent [19]

Zamora et al.

[11] Patent Number: 5,223,567
[45] Date of Patent: Jun. 29, 1993

[54] PROCESS FOR PRODUCTION OF AN ETHANOL SOLUTION OF THE ETHYL OR BUTYL HALF-ESTER OF A COPOLYMER OF MALEIC ANHYDRIDE AND METHYL VINYL ETHER

[75] Inventors: John N. Zamora, Paramus; Alan J. Carlin, Wayne, both of N.J.; Mohammed Tazi, Marietta, Ga.

[73] Assignee: ISP Investments Inc., Wilmington, Del.

[21] Appl. No.: 852,425

[22] Filed: Mar. 16, 1992

[51] Int. Cl.$^5$ .................. C08L 31/00; C08F 8/14; C08F 20/08
[52] U.S. Cl. .................. 524/559; 524/379; 525/304; 525/327.7; 526/79
[58] Field of Search ............ 524/379, 559; 525/304, 525/327.7; 526/79

[56] References Cited

U.S. PATENT DOCUMENTS 4,908,413  3/1990  Goertz et al. .................. 525/304
4,939,198  7/1990  Tazi et al. .................. 524/379

Primary Examiner—Paul R. Michl
Assistant Examiner—LaVonda DeWitt
Attorney, Agent, or Firm—Walter Katz; Marilyn J. Maue; Joshua J. Ward

[57] ABSTRACT

There is described a process for the production of an ethanol solution of an ethyl or butyl half-ester copolymer of maleic anhydride and a methyl vinyl ether which comprises: (a) copolymerizing the monomers in acetone as solvent by simultaneously feeding molten maleic anhydride, a molar excess of methyl vinyl ether, and a solution of a free radical initiator in acetone, into a reactor precharged with acetone, at about 68°–85° C., preferably 70°–80° C.; (b) esterifying the acetone solution of said copolymer with ethanol or butanol; and then (c) solvent exchanging ethanol for acetone by continuously injecting vapors of ethanol at about 85°–95° C. into said copolymer solution while simultaneously distilling out acetone therefrom at atmospheric pressure.

5 Claims, No Drawings

PROCESS FOR PRODUCTION OF AN ETHANOL SOLUTION OF THE ETHYL OR BUTYL HALF-ESTER OF A COPOLYMER OF MALEIC ANHYDRIDE AND METHYL VINYL ETHER

BACKGROUND OF THE INVENTION

1. Field of the Invention

This invention relates to a process for the production of an alcoholic solution of an ethyl or butyl half-ester of a copolymer of maleic anhydride and a methyl vinyl ether, and, particularly, to a process for making an ethanol solution of an ethyl or butyl half-ester of maleic anhydride and methyl vinyl ether at a high solids content and low viscosity.

2. Description of the Prior Art

M. Tazi, in U.S. Pat. No. 4,939,198, described a solution feed, solution polymerization process for the production of alcoholic solutions of alkyl half-esters of copolymers of maleic anhydride and an alkyl vinyl ether using acetone as solvent. The process involved precharging a reactor with a molar excess of an alkyl vinyl ether, preferably with some acetone, then feeding maleic anhydride as a solution in acetone into the precharged reactor, solution polymerizing the reactants in the presence of a free radical initiator, half-esterifying the resultant solution with an alkanol, and solvent exchanging the alkanol for acetone. The products obtained contained half-esters of low viscosity and high solids content for use in non-aerosol, pump hair sprays.

Goertz, in U.S. Pat. No. 4,908,413, described a similar process in which a portion of the monomer reactants were dissolved initially in precharged acetone as solvent, and the remainder was metered in over several hours. The maleic anhydride monomer was introduced as a solution in acetone and the alkyl vinyl ether as the liquid itself. The copolymer solution was esterified by addition of ethanol to the copolymer solution at 56° C. resulting in a viscous pasty heterogeneous mass because the copolymer was insoluble in ethanol. After stirring for an extended period of time, the mass became more homogeneous. Then distillation was begun under reduced pressure with additional ethanol being added whenever the limit of stirrability was reached.

These and other processes for making such products, however, have certain disadvantages or limitations, which are desired to overcome in this invention, in order to provide a more commercially effective process.

OBJECTS AND FEATURES OF THE INVENTION

Accordingly, it is an object of this invention to provide an advantageous process for the production of an alcoholic solution of an ethyl or butyl half-ester of a copolymer of maleic anhydride and methyl vinyl ether which solution is substantially colorless, which copolymer has a predetermined viscosity, preferably a low specific viscosity, and, preferably, is present in a high solids content in the solvent, with, most preferably, a minimum of residual monomers therein, at low residual solvent levels and without side reaction products, which might form between monomers and solvent during the copolymerization.

A feature of this invention is the provision of such a process wherein feed streams of molten maleic anhydride, liquid methyl vinyl ether and a free radical initiator dissolved in acetone are introduced in a reactor precharged with acetone in a continuous manner during the course of the polymerization; the copolymer is esterified with ethanol or butanol; and ethanol vapor is solvent exchanged for acetone while the ethyl or butyl half-ester product remains in solution and acetone is removed.

These and other objects and features of the invention will be made apparent from the following description thereof.

SUMMARY OF THE INVENTION

What is described herein is a commercially effective process for the production of an ethanol solution of the ethyl or butyl half-ester of a copolymer of maleic anhydride and a methyl vinyl ether. In the first step, the monomers are copolymerized in acetone as solvent in a predetermined manner to provide an acetone solution of the copolymer which is substantially colorless and odorless. The copolymer has a predetermined specific viscosity corresponding to a K-value of about 30–40; and it is present suitably in a high solids content, preferably about 48% or more, in the solution. At this point, the solution is substantially free of residual monomers, e.g. less than 2.3% methyl vinyl ether, or side reaction products between monomers and solvent, such as might arise by reaction between maleic anhydride and water present in the acetone solvent to produce maleic acid.

More particularly, in the present invention, there is described a process for the production of an ethanol solution of an ethyl or alkyl half-ester copolymer of maleic anhydride and methyl vinyl ether which comprises:

(a) copolymerizing the monomers in acetone as solvent by simultaneously feeding molten maleic anhydride, a molar excess of methyl vinyl ether, and a solution of a free radical initiator in acetone, into a reactor precharged with acetone, at about 68°–85° C., preferably about 70°–80° C.;

(b) esterifying the acetone solution of said copolymer with ethanol or butanol; and (c) solvent exchanging ethanol for acetone by continuously injecting vapors of ethanol at about 85°–95° C. into said copolymer solution while simultaneously distilling out acetone therefrom at atmospheric pressure.

In a preferred embodiment of the invention, the process is carried out by sparging the ethanol vapors below the surface of the copolymer solution to maintain the solution in an agitated state during distillation of acetone.

Copolymerization of the monomers in acetone is carried out in the presence of a free radical initiator, preferably an alkyl or acryl peroxide or a peroxy ester.

In one embodiment of the invention, wherein ethanol is used for both esterification and solvent exchange, these steps may be carried out simultaneously upon addition of the ethanol vapor. In another embodiment, wherein the esterifying alcohol is butanol, the esterification step precedes the introduction of ethanol vapor for the solvent exchange step.

DETAILED DESCRIPTION OF THE INVENTION (a) Copolymerization

In accordance with the invention, a reactor vessel is precharged with acetone as a solvent at about 68°–85° C., preferably about 70°–80° C. Higher copolymerization temperatures facilitate formation of higher specific viscosity (higher molecular weights, or higher K-values) copolymers, while lower copolymerization temperatures in this range will provide lower viscosity copolymers.

Then a source of maleic anhydride is provided external to the reactor to feed molten maleic anhydride continuously into the reactor at a predetermined rate during the course of copolymerization.

The liquid methyl vinyl ether monomer reactant, is introduced into the reactor simultaneous with the maleic anhydride monomer to form a reactant mixture containing an excess of methyl vinyl ether over the 1:1 stoichiometric ratio in the copolymer, preferably only up to about 10-15% excess. The alkyl vinyl ether liquid also is introduced continuously into the acetone precharged reactor during the copolymerization. The total period of addition of the streams is about 4-8 hours.

A suitable polymerization initiator also is provided external to the reactor as a solution in acetone. This material is a free radical initiator, preferably an alkyl or acyl peroxide, such as dilauryl peroxide or decanoyl peroxide, or a peroxy ester, such as t-butylperoxy pivalate. The acetone solution contains initiator at a concentration of about 5-35% by weight, preferably about 15-25%, and it is introduced continuously during the copolymerization. The initiator level in the reaction mixture suitably is about 1-10% by weight of initiator, preferably 3-6%, based on the amount of maleic anhydride present. Copolymerization is carried out under pressure and with considerable agitation.

The product of the copolymerization is an acetone solution of the copolymer of maleic anhydride and methyl vinyl ether at a predetermined copolymer viscosity and solids content. Suitably, the specific viscosity of the copolymer is about 0.5, preferably about 0.4 or less, as measured as a 1% solution in 2-butanone at 25° C.; and at a solids level of at least about 48%, preferably about 50%.

(b) Esterification

The esterification step is carried out either before or during solvent exchange. Specifically, if a butyl half-ester is desired as the product, then butanol is introduced into the acetone solution of the copolymer at a sufficient temperature to effect the desired esterification, e.g. about 120° C., before carrying out the solvent exchange step. However, if the ethyl half-ester is the sought-after product, then the introduction of ethanol in the manner of the invention can effect both the esterification and solvent exchange steps simultaneously, as described below.

(c) Solvent Exchange

In accordance with a feature of the invention, ethanol as reactant and solvent is continuously injected into the acetone solution of copolymer maintained at its boiling point of about 60° C. as a vapor at about 85°-95° C. at atmospheric pressure, preferably through spargers, and below the surface of the solution, to act as a highly efficient method of introducing heat. Conventional heat transfer via heat exchangers is very inefficient due to the viscosity and film forming nature of the reaction mass. Heat transfer coefficients are very low and as a result batch cycle times would be prohibitive without this approach. Ethanol vapor is continuously added and acetone/ethanol vapor continuously removed until the acetone is depleted. In this manner, the ethyl half-ester being formed will remain in a homogeneous, dissolved state while acetone is removed by distillation at atmospheric pressure at the boiling temperature of the solution, or about 60° C. The product is a substantially colorless and odorless ethanol solution of the copolymer at about 50% solids, substantially without residual monomers, acetone or maleic acid.

The ethyl or butyl specific viscosity of the half-ester copolymer in the solution is about 0.3, or less, measured as a 1% solution in 2-butanone at 25° C.

EXAMPLE 1

Ethyl Ester of Maleic Anhydride - Methyl Vinyl Ether in Ethanol (a) Copolymerization A pressurized reactor vessel was precharged with 7819 lbs of acetone and maintained at 70°-80° C. with agitation under a nitrogen atmosphere. Then separate streams of 5225 lbs of molten maleic anhydride (MA), 3713 lbs of liquid methyl vinyl ether (MVE) and a solution of 209 lbs of decanoyl peroxide (DP) in 1033 lbs of acetone, (4% based on MA) were introduced separately and continuously into the precharged reactor.

The MA addition rate was 15.47 lb/min; the MVE addition rate was 21.77 lb/min; and the DP solution addition rate was 5.18 lb/min. The period of addition was 6 hours. The product was a colorless and odorless, viscous, 50% solids acetone solution of the maleic anhydride-methyl vinyl ether copolymer having a specific viscosity of about 0.5 and less. Residual monomers, acetone and maleic acid were substantially absent from the solution.

(b) Esterification and (c) Solvent Exchange

The copolymer solution (in acetone) then was esterified and solvent exchanged with ethanol by injecting vaporized ethanol at 85°-95° C. continuously through spargers below the surface of the solution over an 8 hour period while simultaneously distilling acetone overhead at atmospheric pressure at the boiling point of the solution (approximately 60° C.). The product was a substantially colorless, odorless ethanol solution of the ethyl half-ester of the copolymer at a 50% solids level, with less than 0.2% acetone therein, and substantially no residual monomers or maleic acid, at a specific viscosity of about 0.3 or less.

EXAMPLE 2

Butyl Ester of Maleic Anhydride and

Methyl Vinyl Ether in Ethanol (a) Copolymerization

The procedure of Example I (a) was followed to provide a 50% solids acetone solution of the copolymer of maleic anhydride and methyl vinyl ether.

(b) Esterification 18,000 lbs of the copolymer solution and 3220 lbs of butanol were charged in a reactor, heated to 120° C. and digested for 6 hours to form the butyl half-ester of the copolymer.

(c) Solvent Exchange

After flash distilling for 4 hours, 19,800 lbs of ethanol vapor at 85°-95° C. was continuously injected through spargers as in Example 1 (c) over 8 hours while simultaneously distilling acetone overhead at atmospheric pressure at about 60° C. The butyl half-ester product had substantially the same properties as the product of Example 1 (c).

While the invention has been described with particular reference to certain embodiments thereof, it will be understood that changes and modifications may be made which are within the skill of the art. Accordingly, it is intended to be bound only by the following claims, in which:

What is claimed is:

1. A process for the production of an ethanol solution of an ethyl or butyl half-eser copolymer of maleic anhydride and methyl vinyl ether which comprises:
   (a) copolymerizing the monomers in acetone as solvent by simultaneously feeding molten maleic anhydride, a molar excess of liquid methyl vinyl ether, and an acetone solution of a free radical initiator, into a reactor precharged with acetone at about 68°-85° C.,
   (b) esterifying the acetone solution of said copolymer with ethanol or butanol, and
   (c) solvent exchanging ethanol for acetone in said esterified copolymer solution by continuously injecting vapors of ethanol at about 85°-95° C. at atmospheric pressure into said esterified copolymer solution while simultaneously distilling acetone therefrom.

2. A process according to claim 1 wherein, in step (c) said ethanol vapors are sparged below the surface of the copolymer solution to maintain the solution in an agitated state during said distillation.

3. A process according to claim 1 wherein, in step (a) the free radical initiator is an alkyl or acyl peroxide or a peroxy ester.

4. A process according to claim 1 wherein both said esterification step (b) and said solvent exchange step (c) are carried out simultaneously with ethanol.

5. A process according to claim 1 wherein, in step (b) the esterifying alcohol is butanol, and in step (c), solvent exchange is carried out with ethanol following esterification.

* * * * *